United States Patent [19]
Lee

[11] 3,718,722
[45] Feb. 27, 1973

[54] METHOD OF FORMING A POROUS CELLULOSE ACETATE MEMBRANE
[75] Inventor: Leonard A. Lee, Westfield, N.J.
[73] Assignee: Celanese Corporation, New York, N.Y.
[22] Filed: Sept. 17, 1970
[21] Appl. No.: 73,262

Related U.S. Application Data
[63] Continuation of Ser. No. 600,733, Dec. 12, 1966, abandoned.

[52] U.S. Cl. ................... 264/41, 264/233, 264/234, 264/346
[51] Int. Cl. ........................... B29d 7/02, B29d 7/14
[58] Field of Search ..264/49, 41, 217, 233 X, 234 X, 264/235, 346 X

[56] References Cited

UNITED STATES PATENTS

| 3,344,214 | 9/1967 | Manjikian et al. | 264/217 |
| 2,897,546 | 8/1959 | Clapp et al. | 264/346 |
| 3,133,137 | 5/1964 | Loeb et al. | 264/233 |
| 3,285,765 | 11/1966 | Cannon | 264/49 |
| 3,290,286 | 12/1966 | Kesting | 264/49 |
| 3,310,488 | 3/1967 | Loeb et al. | 264/49 |
| 3,373,056 | 3/1968 | Martin | 264/49 |
| 3,364,288 | 1/1968 | Loer | 264/49 |
| 3,412,184 | 11/1968 | Sharples et al. | 264/49 |
| 3,497,072 | 2/1970 | Cannon | 264/217 |

Primary Examiner—Donald J. Arnold
Attorney—Kenneth E. Macklin

[57] ABSTRACT

In the method of preparing a porous membrane adapted to separate a solute from a solution comprising: (a) dissolving a film-forming cellulosic ester in a solvent for said ester, (b) casting the resulting solution to form a membrane of substantially uniform thickness, (c) evaporating a portion of said solvent for a period of 0.5 to 5 minutes, (d) immersing the thus cast membrane in water, the steps which comprise: (e) annealing the membrane by initially heating it under tension to a temperature between about 70° and 90°C., which is about 5° – 10°C. below the final annealing temperature and then by a final heat treatment without tension at the final annealing temperature from about 75° to 95°C.

9 Claims, No Drawings

A METHOD OF FORMING A POROUS CELLULOSE ACETATE MEMBRANE

This is a continuation of application Ser. No. 600,733, filed Dec. 12, 1966 and now abandoned.

This invention relates to the separation of a solute from a solution and to the porous membranes utilized in such separation. The invention will be described herein as having particular reference to the desalination of saline waters and the phenomena related thereto. While the invention has utility for this particular purpose, it is not limited thereto and, therefore, may find application and utilization in a separation of various chemicals where a solute is to be separated from a solution, e.g., in biomedical research for filtration of viruses, proteins, and other such materials from solutions.

The present invention is predicated on the use of film membranes having improved permeability and surface properties which are prepared by a technique hereinlater set forth more fully. The membrane is, in accordance with common usage, referred to frequently as being "porous." However, the words "pore" and "porous," as used herein, refer only to the fact that the membrane has a structure which allows an appreciable rate of passage of solvent, e.g., fresh water, under suitable conditions. The words "permeability" and "permeable" are used with a similar connotation.

More specifically, the present invention is directed to semi-permeable osmotic membranes, that is, membranes which are permeable to solvent, but not to solute. Heretofore, practical membranes applicable for separation of solute, e.g., salt, from solutions of same have not heretofore been developed. Accordingly, the present invention provides porous membranes which offer improvement in the separation of solute from a solution.

In a specific embodiment of the instant invention, i.e., the separation, the desalinization of saline waters, the salt water is pushed against such a film membrane by the application of hydraulic pressure under which conditions, it is found that the water escaping through the film is considerably depleted in salt content. The process consists of pushing the water, under pressure, through a medium or film membrane containing a permeable structure whose skin or material on the outer surface of the medium in contact with the saline water is of a chemical nature capable of passing water through the permeable structure at a higher rate than dissolved salts. These characteristics of the permeable structure will be particularized in more detail hereinafter.

The flow of the fluid through the porous medium is effected by the application of hydraulic pressure on the saline water side. The saline water under pressure may be kept turbulent during the process in order to prevent the accumulation of a high salt concentration near the porous medium. The degree of desalinization obtainable, and the rate of production of the desalinized water depend upon several factors which include, (1) the bulk concentration of the salts in the saline water in contact with the porous medium, (2) the physical nature of the permeable structure in the porous medium, (3) the chemical nature of the porous medium and/or its surface in contact with the saline water, (4) the degree of agitation of the saline water in contact with the porous medium, and (5) the pressure used for filtration.

The process depends on the existence of semi-permeable osmotic membranes; that is, membranes which are permeable to solvent, but not to solute. Generally, if a solution is placed on one side of the membrane, and pure water on the other, water will diffuse from the pure water side through the membrane to the salt water side. This flow can be prevented by exerting pressure equivalent to the solution osmotic pressure on the salt water. If a pressure higher than the osmotic pressure is exerted on the salt water, the flow can be reversed, and pure water will be removed through the membrane from the salt solution. For sea water the osmotic pressure is about 350 pounds per square inch. It is less for less saline water.

The process further depends on the fact that the semi-permeable character of desalinizing membranes appears to be a function of both the physical nature of the permeable structure and chemical structure in the membrane. The dual requirements of correct membrane chemical structure and permeability structure must be met in order for the process to operate successfully.

The invention herein is particularly directed to porous membrane capable of desalinizing brine solutions at much higher flow rates of the desalinized water than has been found possible by use of porous membranes known to the prior art. An object of the invention is therefore to provide new, original, and improved processes for fabricating the porous membranes of the invention.

A further object is to provide a method of forming films or membranes as in the foregoing object including the steps of casting the solution; thereafter evaporating the solvent from the atmosphere-exposed surface of the cast film for a predetermined period so as to form a skin or distinct outer surface, immersing the film in water or other suitable solvent and thereafter heating the film in a manner hereinlater fully described.

Another object is to provide and make available membranes produced in accordance with the methods referred to in the foregoing objects.

Another object is to separate solutes from solutions by a process of reverse osmosis utilizing the membranes referred to in the foregoing objects.

The invention involves the preparation of a film casting solution from which a film is cast and then treated and prepared as herein described. To provide an understanding generally of the method of preparing the films or membranes, it may be pointed out at the outset that the film casting solution from which the films are cast may or may not contain a pore producing agent, i.e., an agent which produces a structure which allows appreciable rate of passage of fresh water under suitable conditions. This pore producing agent is of the nature of aqueous perchlorate salt solution in a suitable ratio to a film material such as cellulose acetate. Magnesium perchlorate is preferred, if a pore producing agent is employed, while other inorganic perchlorate salts may be utilized, such as sodium per chlorate salts. A solvent, preferably dioxane, is added to dissolve the polymer. Methyl ethyl ketone, dimethyl formamide, and/or acetone and the like may also be used as a solvent or solvents. If no pore producing agent is employed, a solvent such as dimethyl formamide is preferably used. Dioxane, diacetone alcohol, and the like may also be used as the solvent or solvents in the instance when no pore producing agent is employed. The film material may also be other cellulosic esters and cellulosic derivatives with proper adjustments being made in casting solution composition, e.g., modification of the particular casting solvent employed, ratio and identity of casting solvent to pore former, etc.

With the choice of suitable casting solvent, film casting and subsequent solvent evaporation into air is accomplished most conveniently and efficiently, but not necessarily, at ambient temperatures to control the solvent evaporation rate and permit effective initiation of the desired organization of the water-cellulose acetate structure particularly to form the skin or outer surface; then, after a predetermined time such that the solvent is not completely evaporated, the film is immersed in water preferably also at ambient temperature, to prevent complete air drying of the film. Besides water, other liquids may be employed providing they (1) dissolve the casting solvent (2) do not dissolve the polymer, and (3) are soluble in water.

Complete air drying has been found to be harmful in that it reduces the desalinizing capacity of the film and is believed to damage the water-cellulose acetate structure which has been initiated. Finally, the film is heated in accordance with the technique of this invention prior to use to complete the organization of the film for high flow desalinization of saline water.

In accordance with the invention, a pore producing agent, e.g., aqueous magnesium perchlorate, may be employed varying in concentration from 5 percent by weight up to a saturation concentration. The pore producing agent is employed in weight ratios, based on the cellulosic ester of 10:1 (ester to agent), preferably ratios of from about 10:1 to 20:1 (ester to agent) are generally preferred. It has been found that as the concentration of the aqueous magnesium perchlorate is increased above this figure, the flow rate of the water through the completely treated membrane is progressively reduced. At aqueous concentrations below 10 percent there is inadequate magnesium perchlorate to maintain the desired relation between water and cellulose acetate such that in the film the desired organization can be obtained.

The proportions of the materials utilized in the film-forming solution is subject to some variation. Generally, the region wherein best results are obtained is found to be that wherein the ratio of the water miscible solvent, e.g., dioxane, to cellulose acetate is between about 1:1 and 10:1 and the ratio of cellulose acetate to pore producing agent, e.g., magnesium perchlorate, is between about 8:1 and 20:1 by weight. A representative solution, therefore, when a pore producing agent is utilized, would be a mixture of cellulose acetate, dioxane, water and magnesium perchlorate in the percentages of 20, 70, 9 and 1 respectively.

If no pore producing agent is utilized, the ratio of solvent, e.g., dimethyl formamide, to cellulose acetate is between about 1:1 and 10:1. A representative solution, therefore, would be a mixture of cellulose acetate and dimethyl formamide in the percentages 20 percent cellulose acetate and 80 percent dimethyl formamide with no water being used.

The following is a more detailed description of a specific preferred example of the formation of the solution and casting, treatment and preparation of the film in accordance with this invention. By way of example, the casting may be accomplished on a glass plate with the use of a Gardner knife, the supports of which provide the barriers necessary to maintain the desired thickness of the cast film. Preferred thicknesses are approximately 0.010 inch for a film of approximately one-half to two-thirds of the corresponding thickness. The solution is preferably cast at room temperature. After casting the film on the plate, solvent evaporation is allowed to proceed preferably at room temperature. It is allowed to remain at the same temperature for a period of from 0.5 to 5 minutes to permit evaporation of a portion of solvent and provide initial (surface) organization of the film after which it is immersed in water preferably at room temperature. This completes removal of the solvent by diffusion. The time of 0.5 to 5 minutes between casting and immersion is critical. Too short a time prevents the formation of a firm film skin. Too long a time prevents the membrane from having good desalinization qualities. Therefore, it is clear that the primary function of the immersion is not merely to extract the aforementioned materials, but to contribute to obtaining the membrane necessary for optimum results. The optimum time appeared to be 1–2 minutes.

The optimum permeability structure in the finished membrane apparently need not necessarily be the same for all desalinizing membranes; it can vary especially depending upon the chemical nature of the membrane and saline water solution.

The thickness of the finished films is not critical in view of the apparent surface nature of the barrier effect. A film of membrane of the order of 0.004 inch (water swollen thickness) is appropriate.

The treatment by heating or annealing of the membranes is critical, the optimum temperatures being as stated herein. In accordance with the invention, the cast films are heat treated subsequent to the solvent evaporation by placing them under water preferably while under tension, e.g., positioned in a frame or rack. The heat treatment is applied in what may be referred to as a two-stage heat treatment, i.e., the membrane is initially heated to a temperature of between about 70° and 90°C. with the optimum temperature being about 75°–80C. The films are subjected to this initial annealing for a period of time generally ranging from 0.5 hour to 1 hour with the optimum period of time being about 1 hour. The temperature of the water bath is then raised to a range of from about 75° to 96°, preferably from 75° to 85°C. and the films are maintained at this temperature for a period of 2 minutes to 1 hour, preferably 5 minutes to 30 minutes. Thus, the films are initially annealed under tension at a temperature of about 5°–10° below the final annealing temperature with the final annealing temperature ranges from about 75° to 95°C., preferably between 75° and 85°C. When the film is subjected to the final annealing temperature, the heat is applied while the film is in the untensioned state, i.e., is free to shrink.

In a preferred embodiment of the present invention, the annealed membranes are subjected to a high-pressure treatment which serves to optimize the properties thereof. A preferred method of applying the high-pressure treatment is by introducing the annealed membrane into a roll-mill which imparts the necessary pressure.

The foregoing, i.e., annealing treatment and, if desired, high-pressure treatment, results in what may be described as an opalescent film in that it is transparent but has a certain characteristic iridescent appearance. A significant aspect of the film is that only one side is useful, i.e., the skin or material on the outer surface, whereas the other side is not, e.g., the side which is away from the glass plate during casting is the side which must be used against the salt solution. The other side is assembled against a porous plate as referred to hereinlater in more detail.

The apparatus in which the membranes of the present invention are utilized may comprise an upper plate and a lower plate. The upper plate has one or more annular grooves each of which contains an O-ring which serves to seal the upper and lower plates together when pressure is applied. The lower plate has a flange or shoulder which interfits with a corresponding shoulder in the upper plate. Said upper plate has a central opening or aperture and a somewhat enlarged counterbore of relatively shallow depth into which is placed the membrane or film membrane of the instant invention. The lower plate has a circular recess or depression of the same diameter as said counterbore of the upper plate so that these spaces, when matched, form a cylindrical opening. Into this space, in addition to the membrane of the instant invention, is also placed a paper filter or spacer member which is positioned between said membrane and a porous plate or disc which serves as a support for said membrane and which may be prepared from suitable materials such as stainless steel. The upper plate preferably has an annular groove in which is disposed a sealing O-ring which serves to seal the peripheral edges of the membrane, filter paper and porous plate.

The upper plate is provided with an opening for the inlet of the salt solution from the solution reservoir and an outlet for the salt solution. Said opening communicates with a passage which leads directly to the membrane wherein the feed solution is demineralized. Means are provided for removing the desalinized water which has passed through the membrane of the present invention.

The apparatus also comprises a pressure pump means which may be a reciprocating pump driven by air pressure and applied to a pressure regulator which pressurizes the saline solution to be desalinized.

The following examples further illustrate the invention.

EXAMPLE I

This example serves to compare the membrane prepared in accordance with this invention with a membrane annealed in a manner dissimilar from the present invention.

In a preparation of both membranes, a master batch consisting of 80 grams cellulose acetate flake (HLFS 85 grade); 262 grams of dioxane; 4.8 grams of magnesium perchlorate (dry weight) and 41.6 grams of distilled water were intermixed by utilization of a blade tumbler for a period of about 24 hours. A film was cast from the resulting admixture on a glass plate employing a Gardner knife setting of 8 mil. The solvent (dioxane) was allowed to evaporate for a period of 4 minutes. The film was then immersed in distilled water for a period of 1 hour.

One sample of such film was annealed in clean distilled water for a period of 1 hour at a temperature of 80°C. using an annealing frame to impart tension to said film.

A second film was cast as above, was annealed in clean distilled water at 80°C. for 1 hour using an annealing frame to impart tension and then such film was removed from the annealing frame and subsequently annealed in the untensioned state at a temperature of 85°C. for an additional 1 hour in accordance with the present invention.

Each sample of film was placed in an apparatus as hereinbefore described and employed for the desalinization of a saline solution. The solution utilized in each instance contained 5,000 ppm of sodium chloride. In such apparatus, the film in each instance was supported by a stainless steel porous disc (Grade F) and Watman filter paper No. 42 was employed. The initial operating pressure in each instance was 1,000 psig.

In Run No. 1 (membrane of the prior art) 300 ml feed was passed across the membrane in 1 minute and 37 ml of product was collected in 30 minutes. The product contained 0.05 percent (500 ppm) with a return feed of 0.54 percent.

In Run No. 2 (membrane of this invention) 300 ml was passed across the membrane in 1 minute and 30 ml was collected in 30 minutes. The product contained only 0.015 percent (150 ppm) with a return feed of 0.54 percent.

The foregoing comparative data evidence a 33 percent improvement in product purity resulting from the use of the membrane of the instant invention.

EXAMPLE II

A film comprised of components similar to those of Example I was cast on a glass plate using an 8 mil setting. A 1 minute evaporation time was employed for solvent removal and the film was subsequently immersed in distilled water for 1 hour. All samples produced in this manner were initially annealed at a temperature of 70°C. for a period of 1 hour using an annealing frame so as to impart tension to each sample.

A series of samples were prepared from films prepared above as follows:

Sample No. 1: Annealed at 70°C. without tension for 2 minutes.

Sample No. 2: Annealed at 72°C. without tension for 2 minutes.

Sample No. 3: Annealed at 75°C. without tension for 2 minutes.

These samples were each employed in the apparatus hereinbefore described. A saline solution (about 300 ml/min flow rate at 1000 psi) containing about 0.5 percent by weight (5000 ppm) of NaCl was passed through each membrane in accordance with the above method and under substantially similar conditions. The product collected after a period of about 30 minutes in each instance had the following purity.

| | |
|---|---|
| Sample No. 1 | 0.37% |
| Sample No. 2 | 0.21% |

Sample No. 3                                              0.05%

The above data clearly evidence the marked improvement in product purity, i.e., a reduction from 0.37 percent (3,700 ppm) to 0.05 percent (500 ppm) which results when the incremental heating technique of this invention is employed. The data also indicate the importance of the difference between the initial and final annealing temperature, i.e., a 2° increment is not sufficient.

EXAMPLE III

A series of film samples was prepared from a master batch similar to that of Example I and were each cast on a glass plate using a knife setting of 8 mil. A 1 minute solvent evaporation period was utilized and the samples were each immersed in distilled water for a period of 1 hour. Each sample was then annealed in a frame, i.e., under tension, at a temperature of 75°C. for a period of 1 hour. Each sample was further annealed without tension as follows:

Sample No. 1:           Annealed 20 minutes at 75°C.
Sample No. 2:           Annealed 20 minutes at 78°C.
Sample No. 3:           Annealed 20 minutes at 81°C.
Sample No. 4:           Annealed 20 minutes at 84°C.

Each of the samples as prepared above were introduced into the apparatus and utilized with a 0.5 percent saline solution as hereinbefore described. The resulting product purities were as follows:

Sample No. 1                                              0.07%
Sample No. 2                                              0.04%
Sample No. 3                                              0.025%
Sample No. 4                                              0.015%

The foregoing data also illustrate the surprising effect the two stage treatment with an incremental temperature increase has on the removal of solute from solution.

EXAMPLE IV

Two film samples were prepared from a mix similar to those of the preceding examples and were cast on a glass plate with a knife setting of 10 mil. Solvent evaporation was 3 minutes and each sample was subsequently immersed in distilled water for a period of 1 hour.

Sample No. 1 was annealed at a temperature of 70°C. under tension for a period of 1 hour.

Sample No. 2 was annealed at a temperature of 70°C. for a period of 1 hour and subsequently rolled in a roll mill.

Each of said samples were utilized as described hereinbefore. The resulting product purities were:

Sample No. 1                                              0.49%
Sample No. 2                                              0.13%

These data illustrate the favorable effect as reflected by an increase in product purity that rolling imparts to the membrane.

EXAMPLE V

This example serves to illustrate the importance of annealing the membranes of this invention in two stages, i.e., one with tension and the other without tension, and at an initial annealing temperature 5°–10°C. lower than the final annealing temperature.

Thus, three samples were prepared, all in accordance with Example I, except that different annealing techniques were employed. Sample No. 1 was annealed at 75°C. under tension and then at 75°C. without tension, i.e., no temperature increase was employed. Sample No. 2 was annealed at 80°C. under tension only. Sample No. 3 was annealed at a temperature of 75°C. under tension and then at 80°C. without tension, i.e., in accordance with this invention. The marked differences in the resulting product purity (same feed as in preceding examples was as follows:

Sample No. 1      (75°C., tension- 75°C., free)      0.07%
Sample No. 2      (80°C., tension)                   0.04%
Sample No. 3      (75°C., tension- 80°C., free)      0.025%

It is to be understood that the foregoing detailed description is given merely by way of illustration and that many variations may be made therein without departing from the spirit of the invention.

What is claimed is:

1. In the method of preparing a porous membrane adapted to separate a solute from a solution comprising:

a. dissolving a film forming cellulose acetate in a solvent for said cellulose acetate wherein the weight of solvent to cellulose ester is between about 1:1 and 10:1;

b. casting the resulting solution to form a membrane of substantially uniform thickness;

c. evaporating a portion of said solvent for a period of from 0.5 to 5 minutes; and d. immersing the thus cast membrane in water; the steps which comprise:

e. annealing the membrane by initially heating it under tension of from about 0.5 to 1 hour to a temperature of between about 70° and 90°C., which is about 5°–10°C. below the final annealing temperature, and then by a final heat treatment without tension for from about 2 minutes to 1 hour at the final annealing temperature of from about 75° to 95°C.

2. The method of claim 1 wherein the final annealing temperature is from about 75° to 85°C.

3. The method of claim 1 wherein the casting and evaporating are accomplished with said solution being at about room temperature.

4. The method of claim 1 wherein said cellulose acetate is dissolved with said solvent in an aqueous solution of a perchlorate salt pore producing agent wherein the weight ratio of cellulose acetate to pore producing agent is between about 10:1 and 20:1.

5. The method of claim 4 wherein said pore producing agent is magnesium perchlorate.

6. The method of claim 4 wherein the solvent is dioxane.

7. The method of claim 1 wherein the solvent is dimethyl formamide.

8. The method of claim 1 wherein the resultant porous membrane is subject to a rolling step in a roll mill.

9. In the method of preparing a porous membrane adapted to separate a solute from a solution comprising:

a. dissolving a film-forming cellulose acetate in a solvent for said cellulose acetate wherein the weight ratio of solvent to ester is between about 1:1 and 10:1;
b. casting the resulting solution to form a membrane of substantially uniform thickness;
c. evaporating a portion of said organic solvent for a period of from 0.5 to 5 minutes, and
d. immersing the thus cast membrane in water, the step which comprises:
e. annealing the membrane by heating it under tension to a temperature between about 70° and 95°C. for a period of from about 0.5 to 1 hour and then rolling the annealed membrane in a roll mill to produce an opalescent film.

* * * * *